(12) United States Patent
Kardos

(10) Patent No.: US 8,196,707 B2
(45) Date of Patent: Jun. 12, 2012

(54) ARRANGEMENT FOR COOLING OF OIL IN A GEARBOX FOR A VEHICLE

(75) Inventor: Zoltan Kardos, Södertälje (SE)

(73) Assignee: Scania CV AB (SE)

(*) Notice: Subject to any disclaimer, the term of this patent is extended or adjusted under 35 U.S.C. 154(b) by 385 days.

(21) Appl. No.: 12/441,776

(22) PCT Filed: Sep. 11, 2007

(86) PCT No.: PCT/SE2007/050642
§ 371 (c)(1), (2), (4) Date: Mar. 18, 2009

(87) PCT Pub. No.: WO2008/041924
PCT Pub. Date: Apr. 10, 2008

(65) Prior Publication Data
US 2009/0277722 A1    Nov. 12, 2009

(30) Foreign Application Priority Data
Oct. 3, 2006    (SE) ...................................... 0602070

(51) Int. Cl.
*F16H 57/04*    (2010.01)

(52) U.S. Cl. ...................................... 184/6.12; 137/468

(58) Field of Classification Search ................. 184/6.12; 123/41.33, 41.29, 41.1
See application file for complete search history.

(56) References Cited

U.S. PATENT DOCUMENTS

| | | | | |
|---|---|---|---|---|
| 2,188,172 | A * | 1/1940 | Brehob | 123/196 AB |
| 4,317,439 | A * | 3/1982 | Emmerling | 123/563 |
| 4,362,131 | A * | 12/1982 | Mason et al. | 123/41.1 |
| 5,373,892 | A * | 12/1994 | Johnson et al. | 165/41 |
| 5,678,461 | A | 10/1997 | Stine | |
| 6,196,168 | B1* | 3/2001 | Eckerskorn et al. | 123/41.33 |
| 6,536,381 | B2* | 3/2003 | Langervik | 123/41.33 |
| 6,739,290 | B2* | 5/2004 | Iwasaki et al. | 123/41.05 |
| 6,938,605 | B2* | 9/2005 | Al-Khateeb | 123/196 AB |
| 6,955,141 | B2* | 10/2005 | Santanam et al. | 123/41.08 |
| 7,210,522 | B2* | 5/2007 | Gruian | 165/202 |

OTHER PUBLICATIONS

International Search Report dated Jan. 14, 2008, issued in corresponding international application No. PCT/SE2007/060542.

* cited by examiner

*Primary Examiner* — William E Dondero
*Assistant Examiner* — Michael Riegelman
(74) *Attorney, Agent, or Firm* — Ostrolenk Faber LLP

(57) ABSTRACT

An arrangement for cooling oil in a gearbox of a vehicle which is powered by a combustion engine. An oil cooler is fitted in the vehicle close to the gearbox. An oil system circulates oil between the gearbox and the oil cooler. An oil circuit contains a circulating coolant to cool the oil in the oil cooler. A cooling element cools the coolant by air which flows through the cooling element. The cooling element is situated at a location in the vehicle where air at the temperature of the surroundings flows through it. The cooling circuit includes a line to lead the cooled coolant from the cooling element to the oil cooler. The oil in the oil cooler can thus be cooled to a temperature close to the temperature of the surroundings.

6 Claims, 3 Drawing Sheets

ARRANGEMENT FOR COOLING OF OIL IN A GEARBOX FOR A VEHICLE

CROSS REFERENCE TO RELATED APPLICATION

The present application is a 35 U.S.C. §§371 national phase conversion of PCT/SE2007/050642, filed Sep. 11, 2007, which claims priority of Swedish Application No. 0602070-5, filed Oct. 3, 2006, the disclosure of which is incorporated by reference herein. The PCT International Application was published in the English language.

BACKGROUND TO THE INVENTION, AND STATE OF THE ART

The present invention relates to an arrangement for cooling oil in a gearbox in a vehicle by blowing cooling air over a coolant circuit which then cools the oil.

The oil in a vehicle gearbox has to be at a relatively low temperature if the components which are intended to be lubricated and cooled by the oil are to be able to achieve a long service life. A known way of ensuring that the oil in the gearbox will substantially continuously be at a sufficiently low temperature during operation of the vehicle is to use an air-cooled oil cooler for cooling the oil. However, an air-cooled oil cooler has to be so positioned in the vehicle that air which is at the temperature of the surroundings flows through it for it to be able to provide effective cooling of the oil. Air-cooled oil coolers are therefore often situated at the front portion of a vehicle at a location in front of, inter alia, the radiator for cooling the coolant of the combustion engine's cooling system. At this location the oil cooler has flowing through it a forced airflow which is at the temperature of the surroundings and is generated by a radiator fan during operation of the combustion engine. A disadvantage of such positioning of the oil cooler is that the oil has to be transported from the gearbox to the front portion of the vehicle. This entails having to lay relatively long oil lines in the vehicle. Moreover, for safety reasons, the presence of oil in such an exposed region as the front portion of a vehicle is to be avoided.

Another known practice is to use a liquid-cooled oil cooler for cooling of oil in a gearbox. The medium which such oil coolers use for cooling the oil is the existing coolant used in the cooling system for cooling the combustion engine. Liquid-cooled oil coolers may be situated in the vehicle close to the gearbox. In heavy vehicles, the coolant is usually cooled by a radiator situated downstream of a charge air cooler with respect to the intended direction of airflow through these cooling elements. The air is thus warmed by the charge air cooler before it can be used for cooling the coolant in the radiator. The coolant is thus cooled by air which is at a higher temperature than the surroundings. The coolant can therefore not usually be used for cooling the oil in the gearbox to a low enough temperature.

SUMMARY OF THE INVENTION

The object of the present invention is to provide an arrangement for cooling the oil in a gearbox in a vehicle, which arrangement makes it possible to cool the oil in the gearbox to such a low temperature that the components of the gearbox achieve a substantially optimum service life. Another object of the arrangement is to avoid long oil lines in the vehicle and, in particular, to avoid leading oil to exposed regions of the vehicle where the oil might constitute a safety risk.

This object is achieved with an arrangement for cooling oil in a gearbox of a vehicle which is powered by a combustion engine. An oil cooler is fitted in the vehicle close to the gearbox. An oil system circulates oil between the gearbox and the oil cooler. An oil circuit contains a circulating coolant to cool the oil in the oil cooler. A cooling element cools the coolant by air which flows through the cooling element. The cooling element is situated at a location in the vehicle where air at the temperature of the surroundings flows through it. The cooling circuit includes a line to lead the cooled coolant from the cooling element to the oil cooler. The oil in the oil cooler can thus be cooled to a temperature close to the temperature of the surroundings.

Since the arrangement comprises a cooling circuit with a circulating coolant, this means that the oil cooler used for cooling the oil is liquid-cooled. A liquid-cooled oil cooler need not be situated in an air passage but may be situated at substantially any desired location in the vehicle. To minimise the length of the oil lines, the oil cooler is situated close to the gearbox. Such positioning of the oil cooler means that no oil lines need to be laid to the front portion of the vehicle or other exposed regions in the vehicle, as would normally be the case when an air-cooled oil cooler is used. The cooling circuit also comprises a cooling element situated at a location in the vehicle where air at the temperature of the surroundings flows through it. The coolant in the cooling element can thus be cooled to a temperature close to the temperature of the surroundings. The cooled coolant is thereafter led directly to the oil cooler via a line of the cooling circuit. The oil in the oil cooler can therefore be cooled by coolant which is at substantially the temperature of the surroundings. The oil in the gearbox can thus have imparted to it a low enough temperature for the components of the gearbox to be provided with continuously good lubrication and cooling. The components may therefore achieve a substantially optimum service life.

According to an embodiment of the present invention, the cooling circuit is connected to an existing cooling system in the vehicle which is adapted to cooling the combustion engine. The coolant in the existing cooling system is thus used in said cooling circuit for cooling the oil in the oil cooler. Such a cooling circuit may comprise a line intended to receive coolant from the combustion engine's cooling system at a location situated downstream of a radiator adapted to cooling the coolant of the cooling system and upstream of the combustion engine with respect to the direction of coolant flow in the cooling system. The coolant received in the cooling circuit has thus been duly cooled in the vehicle's ordinary radiator and has not yet been used for cooling the combustion engine. The coolant is therefore taken from a region of the cooling system where it is normally at its lowest temperature. The cooling circuit comprises with advantage a line intended to lead coolant back from the oil cooler to the cooling system at a location situated downstream of the combustion engine and upstream of a thermostat with respect to the direction of coolant flow in the cooling circuit. After the coolant has been used for cooling the oil in the oil cooler, the resulting warm radiator liquid is mixed with warm coolant from the combustion engine. The warm coolant is thereafter led via the thermostat to the ordinary radiator in order to be cooled.

According to another embodiment of the invention the arrangement comprises an air passage in the vehicle and said cooling element is situated at a location in the air passage where air at the temperature of the surroundings flows through it. With suitable dimensioning of the cooling element, the coolant can here be provided with cooling to a temperature close to the temperature of the surroundings. The arrangement preferably comprises a radiator fan adapted to providing a forced airflow through the air passage. Good heat transfer can thus be effected between the cooling airflow and the coolant in the cooling element.

According to another preferred embodiment of the invention, said air passage comprises a radiator adapted to cooling the coolant of the combustion engine's cooling system, and at least one cooler situated upstream of the radiator with respect to the intended direction of air flow through the air passage. Such an air passage is usually situated at a front portion of the vehicle. As the available space in a vehicle is limited, it is often advantageous to be able to use such an already existing air passage for cooling the coolant which is used for cooling the oil in the oil cooler. Said cooler situated upstream of the radiator in the air passage may be a charge air cooler. In heavy vehicles in particular it is usual for a charge air cooler to be situated in front of the ordinary radiator. The coolant in the ordinary radiator is thus provided with cooling by air which is at a temperature which clearly may exceed the temperature of the surroundings. The coolant in the ordinary radiator is subjected to cooling to a temperature which is usually too high for it to be usable directly for cooling the oil in the oil cooler to a desired temperature. It is therefore necessary for the coolant to undergo a further step of cooling, which therefore takes place in said cooling element, before it can be used for cooling the oil in the oil cooler to a desired low temperature.

According to a preferred embodiment of the invention, the cooling element is situated in a separate air passage in the vehicle where air at the temperature of the surroundings flows through it. In terms of space in a vehicle, it may be advantageous if the cooling element can be situated in such a separate air passage. Such a separate air passage may also comprise a radiator fan which provides a forced airflow through the passage. Such a radiator fan may be driven by an electric motor. The cooling circuit may constitute a separate cooling system with a separate circulating coolant adapted to cooling the oil in the oil cooler. Such a separate cooling circuit may comprise a coolant pump for circulating the coolant between the oil cooler and the cooling element. With such a separate cooling circuit there need be no involvement of the ordinary cooling system.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
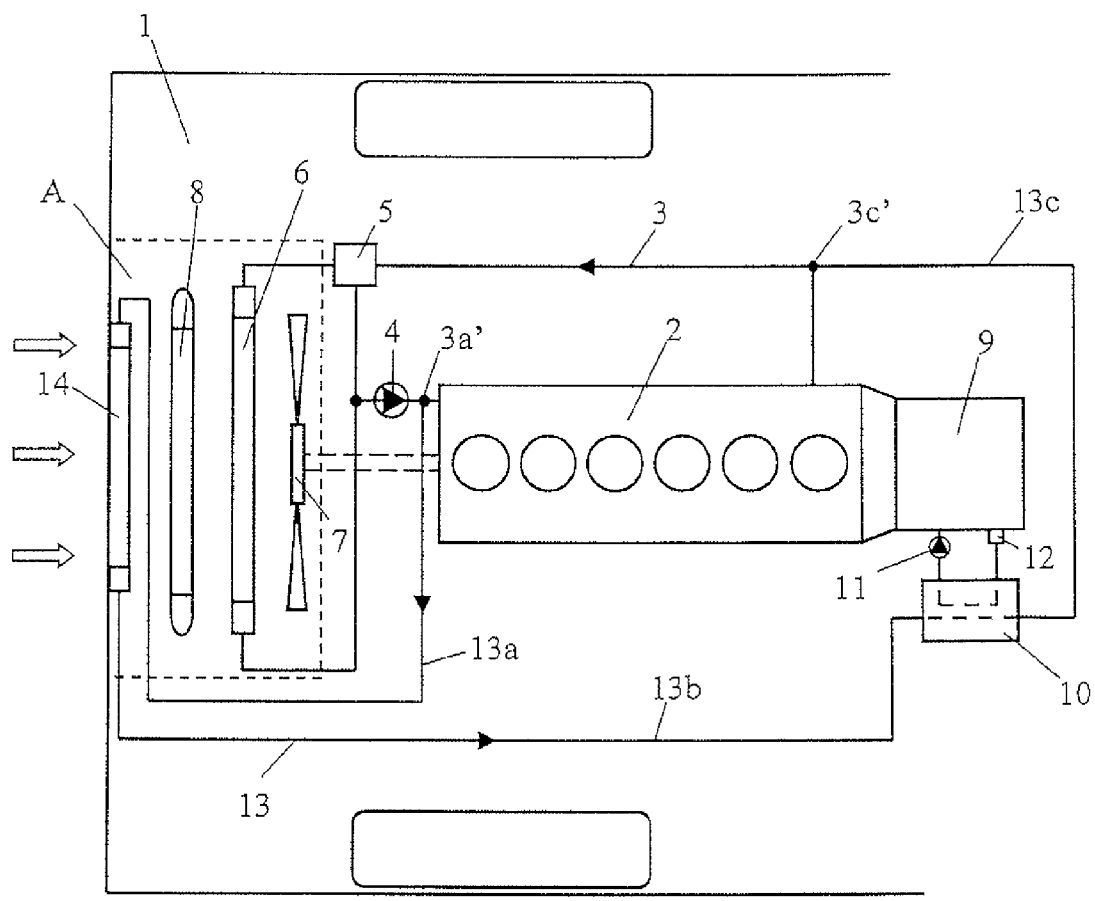
FIG. 1 depicts an arrangement for cooling of oil in a gearbox in a vehicle according to a first embodiment of the invention.

FIG. 1 depicts schematically a vehicle 1 powered by a supercharged combustion engine 2. The vehicle 1 may be a heavy vehicle powered by a supercharged diesel engine. The combustion engine 2 is cooled in a conventional manner by a cooling system 3 which contains a circulating coolant. The coolant is circulated in the cooling system 3 by a coolant pump 4. The cooling system 3 comprises a thermostat 5 adapted to directing the coolant to a radiator 6 or alternatively back to the combustion engine 2 when the temperature of the coolant is below a specific value. The radiator 6 is arranged in an air passage A at a front portion of the vehicle 1. The coolant is cooled in the radiator 6 by the air which flows through the air passage A. A radiator fan 7 is adapted to providing a forced airflow in a specific direction through the air passage A. The radiator fan 7 is driven by the combustion engine 2 via a suitable connection. A charge air cooler 8 is arranged in the air passage A upstream of the radiator 6 with respect to the direction of air flow through the air passage A. The function of the charge air cooler 8 is to cool compressed air before it is led to the supercharged combustion engine 2.

A gearbox 9 is arranged in a conventional manner beside the combustion engine 2. An oil cooler 10 is fitted in the vehicle close to the gearbox 9 in order to cool the oil in the gearbox 9. The oil of the gearbox 9 is circulated in an oil system between the gearbox 9 and the oil cooler 10 by an oil pump 11. A temperature sensor 12 is arranged in the oil system to detect the temperature of the oil. The cooling of the oil in the oil cooler 10 involves using a cooling circuit 13 connected to the cooling system which cools the combustion engine. The cooling circuit 13 can therefore use the existing coolant of the cooling system 3 to cool also the oil in the oil cooler 10. The cooling circuit 13 comprises a line 13$a$ intended to receive coolant from the cooling system at a location 3$a$' situated downstream of the coolant pump 4 and upstream of the combustion engine 2 with respect to the direction of coolant flow in the cooling system 3. The coolant pump 4 can thus be used for circulating coolant in the cooling circuit 13. The line 13$a$ is adapted to leading the coolant to a cooling element 14 in the cooling circuit 13. The cooling element 14 is situated in the air passage A upstream of the charge air cooler 8 and the ordinary radiator 6 with respect to the intended direction of air flow through the air passage A. The cooling element 14 will therefore have air at the temperature of the surroundings flowing through it. The cooling circuit 13 comprises a line 13$b$ adapted to leading the cooled coolant from the cooling element 14 directly to the oil cooler 10. The coolant will thus be at substantially same temperature when it reaches the oil cooler 10 as it had when it left the cooling element 14. The cooling circuit 13 also comprises a line 13$c$ intended to lead coolant back to the cooling system. The coolant is led back at a location 3$c$' situated downstream of the combustion engine 2 and upstream of the thermostat 5 with respect to the direction of coolant flow in the cooling system 3.

During operation of the combustion engine 2 the coolant in the cooling system 3 is circulated by the coolant pump 4. The circulating coolant thus effects cooling of the combustion engine 2. The warm coolant from the combustion engine 2 is cooled in the radiator 6 by air caused to flow through the air passage A by the radiator fan 7. Since the air which flows through the radiator 6 has already flowed through the cooling element 14 and the charge air cooler 8, it will be at a raised temperature relative to the temperature of the surroundings. Thus the coolant in the radiator 6 can at most be cooled to a temperature corresponding to that raised temperature. To cool the combustion engine 2 it is often sufficient for the coolant to be cooled by air which is at such a raised temperature. The cooling circuit 13, which is adapted to cooling the oil of the gearbox 9, receives part of the coolant at a location 3$a$' in the cooling system after it has been cooled in the radiator 6. This portion of the coolant is led via the line 13$a$ to the cooling element 14 which is situated furthest forward in the air passage A. The coolant undergoes here a second step of cooling by air which is at the temperature of the surroundings. The coolant which circulates through the cooling element 14 can thus be cooled to a temperature close to the temperature of the surroundings. The coolant is thereafter led via the line 13b to the oil cooler 10. The oil in the oil cooler 10 may here be cooled by radiator liquid, which is therefore at substantially the temperature of the surroundings. The oil of the gearbox 9 can thus be cooled to a desired low temperature. By means of the oil cooler 10, the oil of the gearbox 9 can be kept continuously at such a low temperature as to provide very good lubrication and cooling of the components of the gearbox 9, which components may therefore achieve an optimum service life. When the coolant has cooled the oil in the oil cooler 10, it is led by the line 13c back to the cooling system at the location 3c'. The coolant which has cooled the oil in the oil cooler 10 is thus mixed with the warm coolant coming from the combustion engine 2. The coolant is thereafter led to the ordinary radiator 6 in order to be cooled. The oil pump 11 in the oil circuit may be controlled by information from the temperature sensor 12 so that oil only starts circulating through the oil cooler 10 when the oil in the gearbox has reached a predetermined temperature. The oil in the gearbox 9 can thus be kept at a substantially constant temperature during operation of the vehicle 1.

Figure 2:
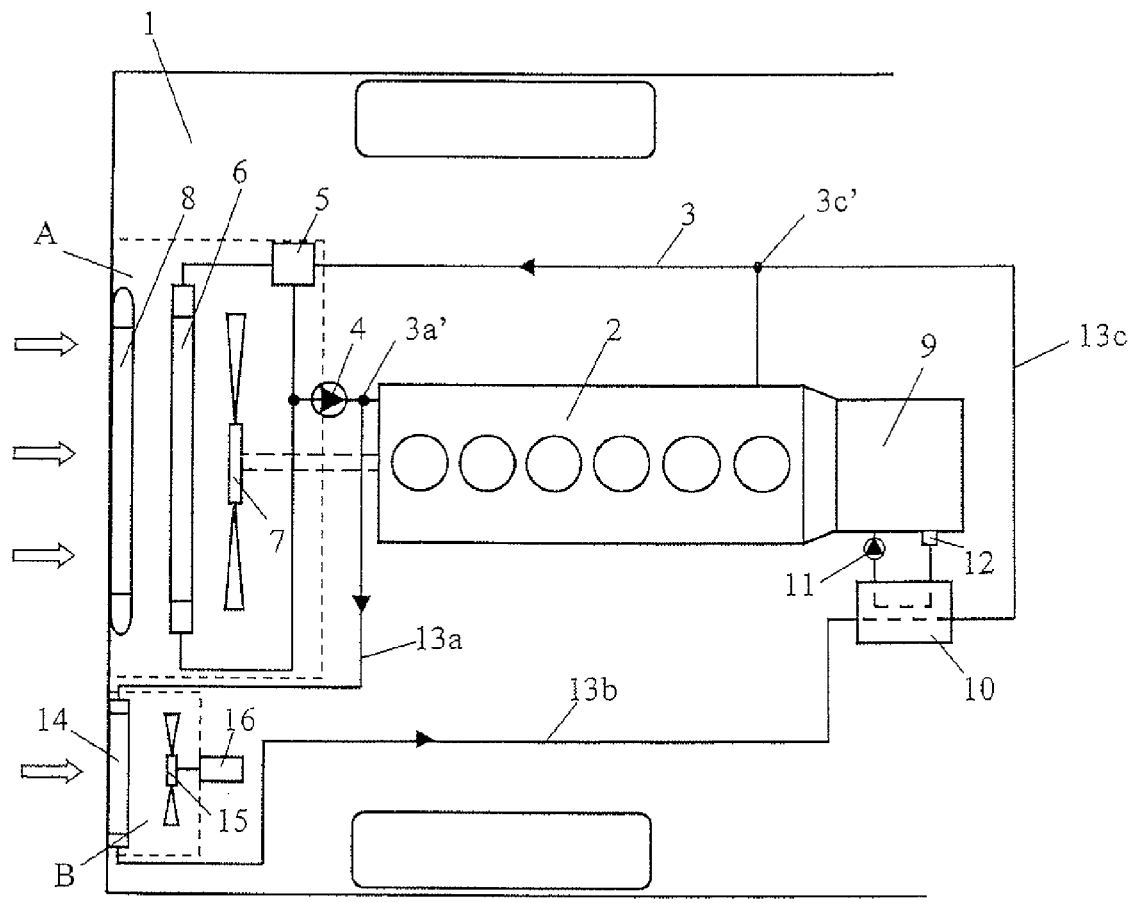
FIG. 2 depicts an arrangement for cooling of oil in a gearbox in a vehicle according to a second embodiment of the invention and FIG. 3 depicts an arrangement for cooling of oil in a gearbox in a vehicle according to a third embodiment of the invention.

FIG. 2 depicts an alternative arrangement for cooling the oil in a gearbox 9 in a vehicle. In this case the cooling element 14 is fitted in a separate air passage B in the vehicle 1. A radiator fan 15 here provides a forced airflow through the cooling element 14. The radiator fan 15 is driven by an electric motor 16. Air which flows through the cooling element 14 is here at the temperature of the surroundings, making it possible to cool the coolant in the cooling element 14 to a temperature close to the temperature of the surroundings. In this case the charge air cooler 8 and the ordinary radiator 6 provide more effective cooling than in the embodiment depicted in FIG. 1, since in this case they will have flowing through them a cooling air flow which has not been warmed by a cooling element 14 situated upstream. The cooling element 14 in the air passage B may therefore be somewhat smaller than in FIG. 1.

Figure 3:
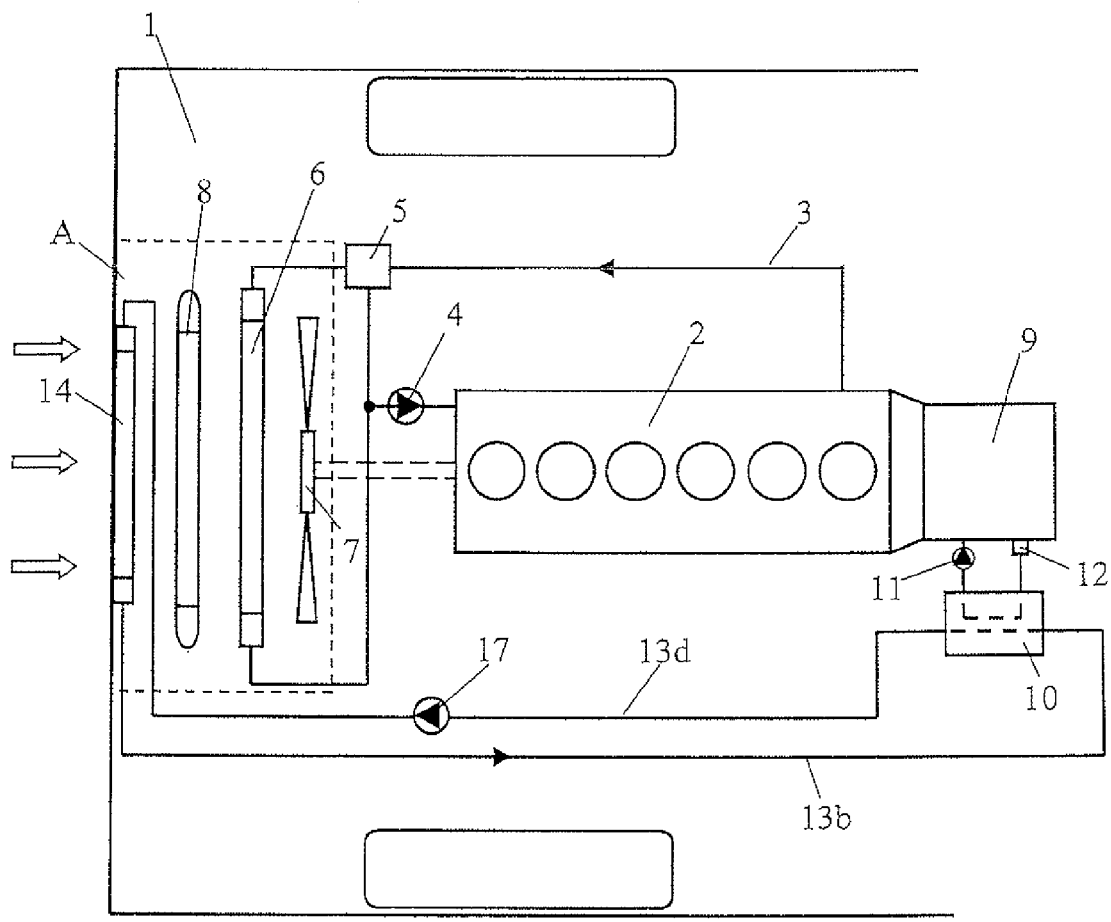

FIG. 3 depicts a further alternative arrangement for cooling the oil in a gearbox 9 in a vehicle. In this case a separate cooling circuit with a coolant circulated through the cooling circuit by a coolant pump 17 is used. The separate cooling circuit comprises a cooling element 14 situated furthest forward in an air passage A at a location upstream of a charge air cooler 8 and an ordinary radiator 6 for cooling the coolant of the combustion engine's cooling system. The coolant of the cooling circuit is here subjected to a step of cooling by air which is at the temperature of the surroundings. Since the coolant is here used only for cooling the oil in the oil cooler 10, such cooling is usually quite sufficient. The coolant may here be at substantially the temperature of the surroundings when it is led from the cooling element 14 directly to the oil cooler 10 via the line 13b. The oil in the oil cooler 10 is thus subjected to good cooling to a low temperature. When the coolant has been warmed by the oil in the oil cooler 10, it is circulated by the coolant pump 17 via a line 13d to the cooling element 14 in order to be cooled again.

The invention is in no way limited to the embodiments described but may be varied freely within the scopes of the claims.

The invention claimed is:

1. An arrangement for cooling oil in a gearbox in a vehicle powered by a combustion engine cooled by a liquid cooling system of the vehicle including a radiator for cooling a circulating coolant, an engine coolant line positioned and configured to lead the circulating coolant from the engine to the radiator, and a thermostat positioned at the engine coolant line, the arrangement comprising:
 an oil cooler positioned in a vicinity of the gearbox and configured to cool the oil from the gearbox;
 an oil system positioned and configured to circulate the oil between the gearbox and the oil cooler;
 a cooling circuit connected to the liquid cooling system of the vehicle, the cooling circuit containing the circulating coolant cooled by the liquid cooling system of the vehicle, the cooling circuit configured and connected to cool the oil in the oil cooler;
 a cooling element positioned, configured and operable to cool the coolant by air which flows through the cooling element, the cooling element being a cooling device other than the radiator;
 a line connected to lead the cooled coolant from the cooling element to the oil cooler;
 a first air passage positioned and configured to lead air which is at a temperature of the surroundings, the cooling element is situated in the first air passage; and
 the cooling circuit comprises a second line connected to lead coolant from the oil cooler to the engine coolant line of the liquid cooling system of the vehicle at a location downstream of the combustion engine and upstream of the thermostat with respect to the direction of coolant flow in the cooling system.

2. An arrangement according to claim 1, wherein the cooling circuit comprises a third line connected to receive the coolant from the liquid cooling system of the vehicle at a location in the cooling system situated downstream of the radiator and upstream of the combustion engine with respect to the direction of coolant flow in the cooling system, the third line connected to lead the coolant to the cooling element.

3. An arrangement according to claim 1, comprising a fan operable to provide a forced air flow through the first air passage.

4. An arrangement according to claim 1, wherein the cooling element is positioned upstream of the radiator with respect to the flow of air in the first air passage.

5. An arrangement according to claim 1, wherein the first air passage is an air passage different and separate from a second air passage, the radiator being positioned in the second air passage.

6. The arrangement according to claim 5, further comprising:
 a first fan positioned in the second air passage and configured to provide the air flow to the radiator; and
 a second fan positioned in the first air passage and configured to circulate the air flow to the cooling element.

* * * * *